United States Patent [19]

Tada et al.

[11] Patent Number: 4,636,554

[45] Date of Patent: Jan. 13, 1987

[54] PROCESS FOR PRODUCING A CHLOROMETHYLATED POLYMER

[75] Inventors: Akira Tada, Yokohama; Takamitsu Morita, Kita-Kyushu; Takeshi Teraue, Kita-Kyushu; Yoshihiro Kusumoto, Kita-Kyushu, all of Japan

[73] Assignee: Mitsubishi Chemical Industries Ltd., Tokyo, Japan

[21] Appl. No.: 681,102

[22] Filed: Dec. 13, 1984

[30] Foreign Application Priority Data

Dec. 26, 1983 [JP] Japan .............................. 58-248852
Jan. 30, 1984 [JP] Japan .............................. 59-14674

[51] Int. Cl.$^4$ ............................................. C08F 8/18
[52] U.S. Cl. ............................ 525/359.3; 525/332.2; 525/332.9; 525/333.3
[58] Field of Search ................................ 525/359.3

[56] References Cited

U.S. PATENT DOCUMENTS

| | | | |
|---|---|---|---|
| 2,694,702 | 11/1954 | Jones ................................ | 525/359.3 |
| 3,607,989 | 9/1971 | Sonnabend ....................... | 525/359.3 |
| 3,625,870 | 12/1971 | Norwood .......................... | 525/359.3 |
| 3,822,244 | 7/1974 | Peyrot .............................. | 525/359.3 |
| 3,995,094 | 11/1976 | Crosby et al. .................... | 525/359.3 |
| 4,207,398 | 6/1980 | Riener .............................. | 525/359.3 |

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

A process for producing a chloromethylated polymer by reacting styrene polymer particles with chloromethyl methyl ether in the presence of a catalyst, characterized in that hydrogen chloride is added to the reaction product mixture, followed by distillation to recover a distillate mixture containing chloromethyl methyl ether.

9 Claims, No Drawings

PROCESS FOR PRODUCING A CHLOROMETHYLATED POLYMER

The present invention relates to a process for producing a chloromethylated polymer, and particularly to a process for producing a chloromethylated styrene polymer which is useful as an intermediate for the production of an anion exchange resin. More particularly, the present invention relates to a method for efficiently recovering an excess amount of chloromethyl methyl ether and its decomposition product remaining in the reaction product mixture after the chloromethylation reaction of the styrene polymer.

In the conventional chloromethylation reaction of a styrene polymer, the styrene polymer was reacted with an excess amount of chloromethyl methyl ether in the presence of a catalyst, and, after the completion of the reaction, water was added to the reaction mixture to deactivate the catalyst. In such a process, the remaining chloromethyl methyl ether is also hydrolyzed simultaneously to form a dilute aqueous solution containing formalin, methanol and hydrochloric acid. Such an aqueous solution has found no utility and used to be sent to the waste water treatment process.

The present inventors have conducted extensive researches with an aim to find an effective method for recovering the excess chloromethyl methyl ether remaining after the chloromethylation reaction, and have finally found a process whereby the remaining excess chloromethyl methyl ether can effectively be recovered by distillation under certain specific conditions. The present invention has been accomplished based on this discovery.

Namely, the present invention provides a process for producing a chloromethylated polymer by reacting styrene polymer particles with chloromethyl methyl ether in the presence of a catalyst, characterized in that hydrogen chloride is added to the reaction product mixture, followed by distillation to recover a distillate mixture containing chloromethyl methyl ether.

Now, the present invention will be described in detail with reference to the preferred embodiments.

The styrene polymer particles used in the process of the present invention, are particles of a cross-linked styrene copolymer, which is made of one or more styrene monovinyl monomers. As such styrene monovinyl monomers, there may be mentioned styrene, α-methylstyrene, vinyltoluene, isopropylstyrene, ethylvinylstyrene, and vinylxylene.

The above styrene polymer contains a small amount of a polyfunctional vinyl monomer as a cross-linking agent, whereby the styrene polymer particles have excellent mechanical strength and solvent resistance.

As such a polyfunctional monomer, there may be mentioned divinylbenzene, trivinylbenzene, ethylene glycol dimethacrylate, tetraethylene glycol dimethacrylate, trimethylolpropane trimethacrylate or butadiene. The amount of the polyfunctional monomer is optionally selected depending upon the particular purpose. However, it is usually employed in an amount of from 1 to 40 mols relative to 100 mols of the styrene monomer.

The chloromethylation reaction of the styrene polymer particles is usually conducted by reacting the styrene polymer particles with chloromethyl methyl ether in the presence of a catalyst. As the catalyst for the chloromethylation reaction, there may be mentioned a Lewis acid such as zinc chloride, aluminum chloride or tin chloride, or a metal oxide such as zinc oxide, aluminum oxide or tin oxide. The amount of such a catalyst is usually from 1 to 500% by weight, preferably from 10 to 300% by weight, based on the styrene polymer particles.

The chloromethylation reaction may be conducted by using chloromethyl methyl ether itself as the reaction solvent. However, for the convenience for the swelling treatment of the styrene polymer particles or for the after-treatment following the chloromethylation reaction, it is preferred to use an organic solvent. As the organic solvent, an ester which is susceptible to hydrolysis or a compound reactive with chloromethyl methyl ether, such as benzene or toluene, is not suitable.

As a suitable organic solvent, there may be mentioned a hydrocarbon such as pentane, hexane, heptane, octane or liquid paraffin; an aliphatic hydrocarbon halide such as ethylene dichloride, dichloropropane, dichloromethane or chloroform; a substituted aromatic hydrocarbon such as nitrobenzene, dinitrobenzene or dichlorobenzene; or an ether such as diethyl ether, dipropyl ether, dibutyl ether or diisoamyl ether. The solvent is used in an amount of at most 5 times by weight, preferably from 0.5 to 3 times by weight, relative to the styrene polymer particles.

The amount of chloromethyl methyl ether relative to the styrene polymer particles, is determined in consideration of the ion exchange capacity of the desired anion exchange resin. It is employed usually in an amount of from 0.5 to 20 molar times, preferably from 1 to 10 molar times, more preferably from 1.5 to 5 molar times, based on the benzene rings in the styrene polymer paticles.

The reaction temperature is usually from 20° to 150° C., preferably from 30° to 100° C. If the reaction temperature is too low, the reaction tends to be slow, and if the temperature is too high, side reactions tend to increase, such being undesirable. The reaction time is usually from 1 to 20 hours.

In order to conduct the reaction smoothly, it is preferred that the polymer is subjected to swelling treatment prior to the reaction. The swelling treatment may be conducted by firstly drying the polymer adequately and then dipping it in or bringing it in contact with an organic solvent at room temperature. As such an organic solvent, it is preferred to use the same solvent as used in the chloromethylation reaction.

After the swelling treatment, predetermined amounts of chloromethyl methyl ether and the catalyst are added, the temperature is further raised, and then the reaction is carried out under stirring in a state where polymer particles are suspended in a dispersing medium comprising an optionally added organic solvent and chloromethyl methyl ether.

According to the present invention, after conducting the reaction for a predetermined period of time, it is necessary to add hydrogen chloride to the reaction product mixture in order to efficiently recover the remaining excess chloromethyl methyl ether and/or its decomposition product, as chloromethyl methyl ether. The details of the mechanism of the present invention are not fully understood. However, the reaction mixture of the above-mentioned chloromethylation involves a number of equilibrium systems, and it is believed that by the addition of hydrogen chloride to the reaction product mixture, for instance, in the following equilibrium reactions, the equilibrium shifts towards the left hand side, whereby chloromethyl methyl ether can efficiently be recovered.

$$CH_3OCH_2Cl + H_2O \rightleftharpoons CH_2O + CH_3OH + HCl$$
$$CH_3CH + CH_3OCH_2Cl \rightleftharpoons CH_3OCH_2OCH_3 + HCl$$

As is evident from the above equilibrium reactions, the higher the concentration of hydrogen chloride in the reaction product mixture, the better. Accordingly, hydrogen chloride is usually used in an amount of from 0.5 to 10 molar times, preferably from 1 to 5 molar times, relative to the chloromethyl methyl ether remaining in the chloromethylation reaction mixture. If the amount of hydrogen chloride is too small, no adequate recovery of chloromethyl methyl ether can be attained. On the other hand, if the amount is excessive, the efficiency for the recovery tends to be poor. The amount of the remaining chloromethyl methyl ether corresponds to the amount obtained by subtracting from the feed chloromethyl methyl ether the amount of the chloromethyl methyl ether taken into the polymer. Therefore, the entire amount is not necessarily present in the form of chloromethyl methyl ether, but is composed of chloromethyl methyl ether and its decomposition products.

The hydrogen chloride to be added to the reaction product mixture, may be in the form of hydrochloric acid or hydrogen chloride gas. As hydrochloric acid, there may be used concentrated hydrochloric acid with a concentration of from 20 to 35% by weight and/or a hydrogen chloride-containing recovered aqueous phase which will be described hereinafter. It is preferred to add hydrochloric acid as the hydrogen chloride, since the catalyst in the reaction product mixture is thereby deactivated, and at the same time the hydrolysis of chloromethyl methyl ether is thereby suppressed.

In the present invention, it is particularly industrially advantageous to employ, as the hydrogen chloride, an aqueous phase obtained e.g. from the synthesis of chloromethyl methyl ether. Namely, chloromethyl methyl ether used as the starting material for the chloromethylation reaction of the styrene polymer, is usually prepared either by reacting methanol, formaldehyde and hydrogen chloride, or by reacting hydrogen chloride with methylated formalin obtained by absorbing formaldehyde in methanol. The reaction mixture obtained from these reactions is separated by liquid separation into an oil phase composed mainly of chloromethyl methyl ether and an aqueous phase containing hydrogen chloride. The separated aqueous phase contains about from 30 to 36% by weight of hydrogen chloride, and thus is useful by itself as the above-mentioned hydrogen chloride source. This aqueous phase contains, in addition to the hydrogen chloride, small amounts of chloromethyl methyl ether, methanol or methylal. However, these components may be recovered together with the initially present chloromethyl methyl ether by distillation as mentioned hereinafter.

On the other hand, hydrogen chloride gas is also useful. However, in this case, the catalyst in the reaction product mixture will not be deactivated. Accordingly, after the completion of the reaction, it is necessary to deactivate the catalyst, e.g. by neutralization treatment with a basic substance.

In the case where hydrochloric acid is used as the hydrogen chloride, polymer particles are obtainable by distillation separation in a state where they are suspended in water. Whereas in the case where hydrogen chloride gas is used, little water is present, or only a small amount of water is present. It is therefore necessary to add, prior to the distillation, a high boiling organic solvent which will not be distilled by the distillation, as a dispersing medium for polymer particles. As such an organic solvent, there may be mentioned, among the above-mentioned solvents for the chloromethylation reaction, those having a high boiling point which are not distilled by the distillation.

After the addition of hydrogen chloride, the reaction product mixture is subjected to distillation, whereby a distillate mixture containing chloromethyl methyl ether is recovered. By the distillation, chloromethyl methyl ether is distilled under normal pressure or reduced pressure. The distillation is usually conducted under heating to a temperature where the dispersing medium i.e. water or a high boiling organic solvent, will not be distilled.

When hydrochloric acid is used as the hydrogen chloride, the recovered distillate mixture comprises chloromethyl methyl ether, methylal (i.e. a 1:2 adduct of formaldehyde and methanol), water, hydrochloric acid, methanol, formalin, etc. When an organic solvent is employed as a reaction medium, such a organic solvent is also distilled. The distillation residue is in a state where chloromethylated styrene polymer particles are suspended in water. The chloromethylated styrene polymer particles will be separated from water, optionally washed with water or suspended in water, and supplied to a subsequent amination step. On the other hand, the above distillate mixture is, when left to stand still, separated into an oil phase comprising a substantial amount of chloromethyl methyl ether and methylal, and, when applicable, an organic solvent, and an aqueous phase comprising water, hydrochloric acid and small amounts of methanol and formalin. The oil phase may usually be used by itself, i.e. without necessity to isolate chloromethyl methyl ether, as the starting material for the next chloromethylation reaction. The aqueous phase is a concentrated aqueous solution of hydrochloric acid, and, as such, can be used by itself as the hydrochloric acid which is added to the chloromethylation reaction product mixture.

Whereas, when hydrogen chloride gas is used as the hydrogen chloride, the recovered distillate mixture will be solely an oil phase composed mainly of chloromethyl methyl ether. Further, when the chloromethylation reaction is conducted in the presence of an organic solvent, the organic solvent will also be distilled depending upon the boiling point of the organic solvent, and constitutes a component of the oil phase. The distillation residue is in such a state that the chloromethylated styrene polymer particles are suspended in the high boiling point organic solvent as the dispersing medium. The chloromethylated styrene polymer particles may usually be supplied to the subsequent amination step without separating the solvent, i.e. in the state as suspended in the solvent. On the other hand, the above-mentioned distillate mixture composed solely of an oil phase, may usually be used by itself, i.e. without necessity to isolate chloromethyl methyl ether, as the starting material for the next chloromethylation reaction.

According to the present invention, by the addition of hydrogen chloride to the chloromethylation reaction product mixture, followed by distillation, it is possible to effectively recover the excess chloromethyl methyl ether used for the chloromethylation reaction of the styrene polymer particles, while preventing the hydrolysis of the chloromethyl methyl ether. Further, the oil phase from the distillate containing chloromethyl methyl ether can be recycled for use as the starting material for the chloromethylation reaction. Furthermore, in some cases, the distilled concentrated hydrochloric acid can be recycled for use as the hydrogen chloride source for the process of recovering chloromethyl methyl ether. Thus, the operation for the waste water treatment can be reduced, and it is thereby possible to set up an industrially advantageous reaction system.

Now, the present invention will be described in further detail with reference to Examples. However, it should be understood that the present invention is by no means restricted by these specific Examples.

In the Examples, "parts" means "parts by weight".

EXAMPLE 1

Into a 1 liter reactor equipped with a stirrer and a temperature controlling device, 100 parts of a styrene-divinylbenzene copolymer (average particle size: 0.4–0.5 mm, particle size range: 0.2–0.8 mm, divinylbenzene content: 5% by weight), 110 parts of ethylene dichloride and 141 parts of chloromethyl methyl ether (chloromethyl methyl ether/benzene rings=1.9) were fed and left for 1 hour at 30° C. under mild stirring for swelling treatment of the polymer particles. Then, 45 parts of zinc chloride powder was added to the reactor, and the chloromethylation reaction was conducted at a reaction temperature of 50° C. for 15 hours under stirring. After the chloromethylation reaction, 250 parts of 35% hydrochloric acid was added to the reaction product mixture. Then, a distillation apparatus was attached to the reactor, and the mixture was heated to 98° C. under normal pressure to distill volatile components. The distillate mixture was left to stand still, the following aqueous phase and oil phase were obtained.

| Aqueous phase: | | |
|---|---|---|
| Water | | 8 parts |
| Hydrochloric acid | | 9 parts |
| Methanol | | 6 parts |
| Others | | 2 parts |
| | Total | 25 parts |
| Oil phase: | | |
| Ethylene dichloride | | 110 parts |
| Chloromethyl methyl ether | | 44 parts |
| Methylal | | 1 part |
| Others | | 15 parts |
| | Total | 170 parts |

From the distillation residue, the polymer particles were taken out, washed with water and dried. Then, the chloromethyl group content in the polymer particles was measured and found to be 24%, which corresponds to 55 parts of the chloromethyl methyl ether. Thus, the theoretical amount of the unreacted chloromethyl methyl ether is 86 parts.

The above recovered oil phase contained 44 parts of chloromethyl methyl ether. Thus, the recovery rate of chloromethyl methyl ether was 51%.

The chloromethyl group content in the polymer particles was determined by aminating the polymer particles with trimethylamine to obtain an anion exchange resin and calculating the chloromethyl group content from the ion exchange capacity.

EXAMPLE 2

The chloromethylation reaction and the recovery of chloromethyl methyl ether were conducted in the same manner as in Example 1 except that 100 parts of a styrene-divinylbenzene copolymer (divinylbenzene content: 3% by weight), 140 parts of ethylene dichloride and 177 parts of chloromethyl methyl ether (chloromethyl methyl ether/benzene rings=2.3) and 40 parts of zinc chloride powder were used, whereby the following aqueous phase and oil phase were obtained.

| Aqueous phase: | | |
|---|---|---|
| Water | | 9 parts |
| Hydrochloric acid | | 14 parts |
| Methanol | | 9 parts |
| Methylal | | 6 parts |
| Others | | 7 parts |
| | Total | 45 parts |
| Oil phase: | | |
| Ethylene dichloride | | 138 parts |
| Chloromethyl methyl ether | | 78 parts |
| Methylal | | 19 parts |
| Others | | 24 parts |
| | Total | 259 parts |

The chloromethyl group content in the polymer was measured and found to be 26%. The recovery rate of chloromethyl methyl ether was 68%.

EXAMPLE 3

First step

Into a 5 liter reactor equipped with a stirrer, a temperature controlling device and a hydrogen chloride gas supply tube, 920 parts of methylated formalin (an equimolar amount of formaldehyde was absorbed in methanol) and 120 parts of methanol were fed, and the synthesis of chloromethyl methyl ether was conducted by blowing in a total amount of 760 parts of hydrogen chloride gas at a constant rate over a period of 2 hours while maintaining the temperature at a level of 25° C. under stirring.

The reaction mixture was left to stand still, and liquid separation was conducted to obtain the following oil phase and aqueous phase.

| Oil phase (950 parts): | |
|---|---|
| Chloromethyl methyl ether | 80.4% |
| Methylal | 4.0% |
| Hydrogen chloride | 8.3% |
| Others (Methanol, etc.) | 7.3% |
| Aqueous phase (570 parts): | |
| Chloromethyl methyl ether | 1.7% |
| Methylal | 4.1% |
| Hydrogen chloride | 36.5% |
| Methanol | 8.8% |
| Formaldehyde | 4.3% |
| Water | 44.6% |

Second step

Into a 1 liter reactor equipped with a stirrer and a temperature controlling device, 100 parts of a styrene-divinylbenzene copolymer (average particle size: 0.4–0.5 mm, particle size range: 0.2–0.8 mm, divinylbenzene content: 5% by weight), 110 parts of ethylene dichloride and 170 parts of the oil phase obtained in the above first step (corresponding to 137 parts of chloromethyl methyl ether, chloromethyl methyl ether/aromatic rings=1.8) were fed, and left at 30° C. for 1 hour under mild stirring for swelling treatment of the polymer particles. Then, 45 parts of zinc chloride powder was added to the reactor, and the chloromethylation reaction was conducted at a reaction temperature of 50° C. for 15 hours under stirring.

To the reaction product mixture obtained by the chloromethylation reaction, 250 parts of the aqueous phase (corresponding to 91 parts of hydrogen chloride) obtained in the above first step was added. Then, a distillation apparatus was attached to the reactor, and the mixture was heated to 98° C. under normal pressure to distill volatile components. The distillate mixture thereby obtained was left to stand still and subjected to liquid separation, whereby the following oil phase and aqueous phase were obtained.

| Oil phase (213 parts): | |
| --- | --- |
| Ethylene dichloride | 51.6% |
| Chloromethyl methyl ether | 35.7% |
| Methylal | 7.0% |
| Others | 5.6% |
| Aqueous phase (43 parts): | |
| Water | 27.9% |
| Hydrogen chloride | 30.2% |
| Methanol | 23.3% |
| Others | 18.6% |

As the distillation residue, there was obtained an aqueous phase in which chloromethylated polymer was dispresed. The polymer was collected by filtration, washed with water and dried. Then, the chloromethyl group content in the polymer was measured and found to be 24%, which corresponds to 55 parts of chloromethyl methyl ether. Thus, the theoretical amount of the unreacted chloromethyl methyl ether was 82 parts.

The oil phase recovered by the above distillation, contained 76 parts of chloromethyl methyl ether, and thus the recovery rate of chloromethyl methyl ether in Example 3 was 93%.

The chloromethyl group content in the polymer was determined by aminating the polymer with trimethylamine to obtain an anion exchange resin, and calculating the chloromethyl group content from the ion exchange capacity.

COMPARATIVE EXAMPLE

The chloromethylation reaction was conducted in the same manner and by means of the same apparatus as in Example 1. To the reaction product mixture obtained by the chloromethylation reaction, 310 parts of water was added, and the mixture was heated to 98° C. to distill volatile components in the same manner as in Example 1. The distillate mixture was left to stand still, whereby the following aqueous phase and oil phase were obtained.

| Aqueous phase | | |
| --- | --- | --- |
| Water | 16 | parts |
| Methanol | 10 | parts |
| Formalin | 3 | parts |
| Total | 29 | parts |
| Oil phase | | |
| Ethylene dichloride | 110 | parts |
| Methylal | 35 | parts |
| Methanol | 4 | parts |
| Methylene chloride | 3 | parts |
| Total | 152 | parts |

No chloromethyl methyl ether was detected in the above distillate mixture and the distillation residue.

The chloromethyl group content in the polymer was measured and found to be 24%.

We claim:

1. A process for producing a chloromethylated polymer by reacting styrene polymer particles with chloromethyl methyl ether in the presence of a catalyst, characterized in that hydrogen chloride is added to the reaction product mixture in an amount of from 0.5 to 10 molar times relative to the chloromethyl methyl ether remaining in said reaction product mixture, followed by distillation to recover a distillate mixture containing chloromethyl methyl ether.

2. The process according to claim 1, wherein the hydrogen chloride is added as 20–35 wt. % hydrochloric acid solution.

3. The process according to claim 1, wherein the hydrogen chloride is added as hydrogen chloride gas.

4. The process according to claim 1, wherein the chloromethyl methyl ether recovered by the distillation is recycled for use in the chloromethylation reaction of the styrene polymer particles.

5. The process according to claim 2, wherein the distillate mixture is separated by liquid separation into an oil phase containing chloromethyl methyl ether and an aqueous phase containing hydrogen chloride, and the oil phase containing the chloromethyl methyl ether is recycled for use in the chloromethylation reaction of the styrene polymer particles.

6. The process according to claim 5, wherein the aqueous phase containing hydrogen chloride is reused as the hydrogen chloride which is added to the reaction product mixture.

7. The process according to claim 1, wherein the chloromethylation reaction is conducted in the presence of an organic solvent.

8. The process according to claim 1, wherein the styrene polymer particles are styrene-divinylbenzene copolymer particles.

9. The process according to claim 1, wherein a reaction product obtained by the reaction of methanol, formaldehyde and hydrogen chloride, is separated into an oil phase containing chloromethyl methyl ether and an aqueous phase containing hydrogen chloride, the oil phase is used as the chloromethyl methyl ether which is reacted with the styrene polymer particles, and the aqueous phase is used as the hydrogen chloride which is added to the reaction product mixture.

* * * * *